(12) United States Patent
Yamanaka et al.

(10) Patent No.: US 9,109,655 B2
(45) Date of Patent: Aug. 18, 2015

(54) ELEMENTS OF DRIVE POWER TRANSFER BELT OF BELT-DRIVE CONTINUOUSLY VARIABLE TRANSMISSION FOR VEHICLE

(75) Inventors: Ken Yamanaka, Toyota (JP); Yuji Nagasawa, Seto (JP); Ichiro Tarutani, Owariasahi (JP)

(73) Assignees: TOYOTA JIDOSHA KABUSHIKI KAISHA, Aichi-ken (JP); KABUSHIKI KAISHA TOYOTA CHUO KENKYUSHO, Aichi-ken (JP)

( * ) Notice: Subject to any disclaimer, the term of this patent is extended or adjusted under 35 U.S.C. 154(b) by 344 days.

(21) Appl. No.: 13/372,965

(22) Filed: Feb. 14, 2012

(65) Prior Publication Data

US 2012/0208663 A1    Aug. 16, 2012

(30) Foreign Application Priority Data

Feb. 15, 2011    (JP) ................. 2011-029345

(51) Int. Cl.
| | | |
|---|---|---|
| *F16G 1/21* | (2006.01) | |
| *F16G 1/22* | (2006.01) | |
| *F16G 5/16* | (2006.01) | |

(52) U.S. Cl.
CPC ...................................... *F16G 5/16* (2013.01)

(58) Field of Classification Search
CPC ........ F16G 5/16; B21D 53/14; B24B 21/002; B62K 25/283; B62M 17/00
USPC ......................................... 474/242, 244, 245
See application file for complete search history.

(56) References Cited

U.S. PATENT DOCUMENTS

| | | | | |
|---|---|---|---|---|
| 4,281,483 | A * | 8/1981 | Horowitz et al. | 451/59 |
| 4,906,225 | A | 3/1990 | Van Lith | |
| 4,968,288 | A * | 11/1990 | Lecouturier et al. | 474/242 |
| 6,875,143 | B2 * | 4/2005 | Brandsma | 474/242 |
| 7,963,873 | B2 * | 6/2011 | Kobayashi | 474/242 |
| 8,047,939 | B2 * | 11/2011 | Van Der Meer | 474/242 |
| 8,449,419 | B2 * | 5/2013 | Morino et al. | 474/245 |
| 8,579,747 | B2 * | 11/2013 | Ochi et al. | 474/264 |
| 2003/0050142 | A1 * | 3/2003 | Akagi et al. | 474/242 |
| 2008/0305906 | A1 * | 12/2008 | Kobayashi | 474/242 |

FOREIGN PATENT DOCUMENTS

| | | |
|---|---|---|
| EP | 1 236 928 A1 | 9/2002 |
| JP | 2700334 B2 | 1/1998 |
| JP | 2001-200894 A | 7/2001 |
| JP | 2002-257200 A | 8/2002 |
| JP | 2003-247605 A | 9/2003 |
| JP | 2005-042803 A | 2/2005 |
| JP | 2006-022921 A | 1/2006 |

* cited by examiner

*Primary Examiner* — Henry Liu
(74) *Attorney, Agent, or Firm* — Sughrue Mion, PLLC

(57) ABSTRACT

Provided are elements arranged along a ring of a drive power transfer belt wound on pulleys of a belt-drive continuously variable transmission. Each element has a recess at one side of the element and a projection projecting from the other side to fit into the recess of the adjacent element. The projection has a first engagement portion provided at its base side such that a predetermined engagement gap is created on the radially outer side when the projection fits in the recess of the adjacent element, and a second engagement portion provided at the tip side of the projection and decreasing in diameter toward the tip of the projection from the first engagement portion. The gradient with which the diameter of the second engagement portion decreases is larger than the gradient with which the diameter of the first engagement portion decreases toward the tip of the projection.

7 Claims, 12 Drawing Sheets

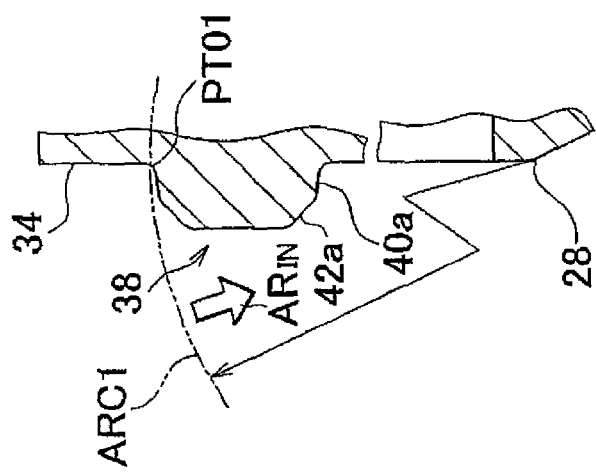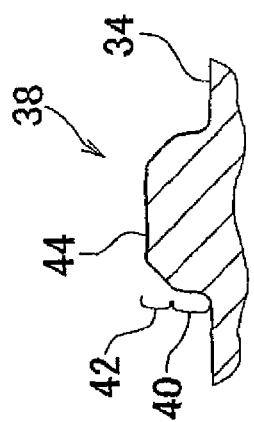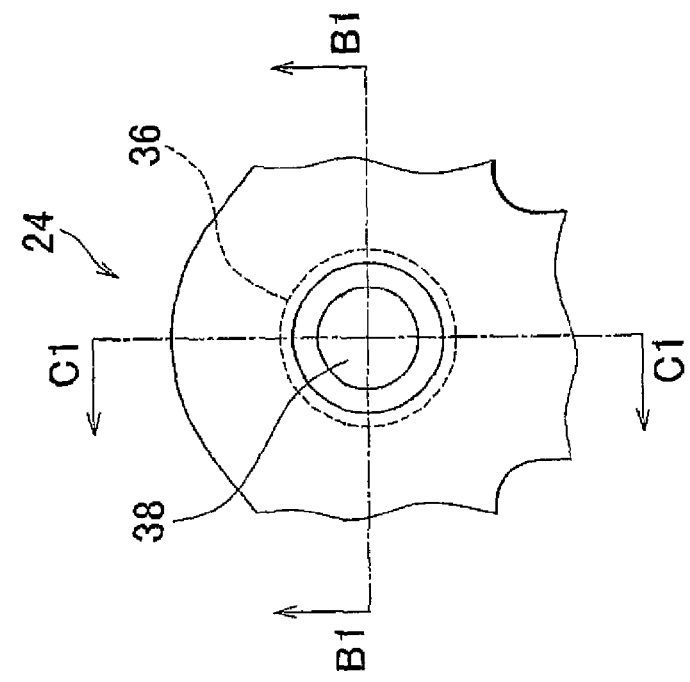

ELEMENTS OF DRIVE POWER TRANSFER BELT OF BELT-DRIVE CONTINUOUSLY VARIABLE TRANSMISSION FOR VEHICLE

INCORPORATION BY REFERENCE

The disclosure of Japanese Patent Application No. 2011-029345 filed on Feb. 15, 2011 including the specification, drawings and abstract is incorporated herein by reference in its entirety.

BACKGROUND OF THE INVENTION

1. Field of the Invention

The invention relates to the structure of elements used as parts of a drive power transfer belt wound on a pair of pulleys used in a belt-drive continuously variable transmission for vehicles and each having a variable-width groove.

2. Description of Related Art

A belt-drive continuously variable transmission is known which is provided on a power transfer path and which is constituted of a pair of pulleys each having a variable-width groove and a drive power transfer belt having a plurality of elements that are compressed at each pulley in a sandwiching manner and that are arranged in series on looped rings in the direction corresponding to the direction in which the thickness of each element is measured (will hereinafter be referred to as "element thickness direction" where necessary), the drive power transfer belt being wound on the pulleys so as to transfer power. According to such a drive power transfer belt, power is transferred between the pulleys via the drive power transfer belt with the elements pressed against each other in the element thickness direction. Therefore, if the opposed sides of the elements adjacent to each other are not sufficiently upright and parallel to each other when they are stacked on each other in the element thickness direction, an undesirable behavior or motion of each element may occur, resulting in noises and reduced efficiencies. Such a problem is described in Japanese Patent Application Publication No. 2003-247605. Further, Japanese Patent Application. Publication No. 2003-247605 describes elements for addressing the problem. Further, Japanese Patent Application Publication No. 2005-042803 includes some descriptions on the stress acting on the elements.

The elements described in Japanese Patent Application Publication No. 2003-247605 each have a recess formed at one side of the element and a projection projecting from the other side of the element, and the projection of each element engages with the recess of the element next to it. Further, the elements described in Japanese Patent Application Publication No. 2003-247605 each have a raised portion that is slightly raised from around the projection at the other side of the element. The ratio of the length over which the raised portion is raised from the other side of the element to the thickness of the element is 0.005 or lower. According to Japanese Patent Application Publication No. 2003-247605, the structure described above ensures that the opposed sides of the elements are kept upright sufficiently.

The projections of the respective elements described in Japanese Patent Application Publication No. 2003-247605 are generally columnar. Further, in belt-riding sections in which the drive power transfer belt wound on the pulleys are sandwiched by the respectively pulleys, the elements adjacent to each other incline relative to each other at a certain angle, as viewed in the axial direction of the pulleys, and for the purpose of allowing such relative inclinations of the elements adjacent to each other, the radial gap that is created between the projection and the recess when they are in engagement with each other is very large. For example, FIG. 13 schematically illustrates an example case where elements 510 are stacked on each other along the drive power transfer belt, as viewed from the radially outer side of the drive power transfer belt. In the example case illustrated in FIG. 13, if the diameter of each recess 512 is D1, the diameter of each projection 514 is D2, and the width of the radial gap between the projection 514 and the recess 512 is $CLC_D$, the width of the radial gap $CLC_D$ is calculated as $CLC_D=D1-D2$.

If the radial gap between the projection 514 and the recess 512 is very large, for example, the elements 510 stacked on each other can not be sufficiently inhibited from moving upward, downward, leftward, and rightward in directions parallel or substantially parallel to the opposed sides of the elements 510 in the belt-riding section at one of the pulleys and the belt-riding section at the other, and this results in undesirable behaviors and motions of the elements 510. Note that "belt-riding sections" represent sections in which the drive power transfer belt rides on the respective pulleys. The "undesirable behaviors and motions" of the elements 510 include, for example, an increase in the amount of pitching motion of each element 510 that pitches as viewed in the axial direction of the pulleys, and an increase in the amount of yawing motion of each element 510 that yaws as indicated by the arrows ARyw in FIG. 13, as viewed from the radially outer side or radially inner side of the drive power transfer belt.

When undesirable behaviors and/or motions of the elements 510 occur in either of the belt-riding sections, for example, the elements 510 slightly rub against each other at the position from which the drive power transfer belt leaves the pulley and at the position at which the drive power transfer belt comes to ride on the pulley, and this may cause an increase in the power loss (belt loss) that the drive power transfer belt causes during the power transfer through it. FIGS. 14A and 14B are views for illustrating, as one example of "undesirable behaviors and motions" of each element 510, how the amount of yawing motion of each element 510 increases in "belt-released sections" in which the drive power transfer belt are on neither of the two pulleys.

FIGS. 14A and 14B illustrate how the yaw angle of the element 510 described in Japanese Patent Application Publication No. 2003-247605, which is an example of related-art elements, changes over the entire circumference of a drive power transfer belt 516. With the drive power transfer belt 516 shown in FIGS. 14A and 14B, the drive power is transferred from a drive pulley (drive sheave pair) 520 to a driven pulley (driven sheave pair) 518 with the stacked elements 510 being pressed against each other. The chart of FIG. 14B shows that the more distant the value of the yaw angle is from the zero level, the larger the amount of yawing motion, regardless of which of the negative and positive sides the value of the yaw angle is in. The positions [1] to [4] at the horizontal axis of the chart in FIG. 14B correspond, respectively, to circumferential positions [1] to [4] at the drive power transfer belt 516 shown in FIG. 14A. More specifically, the circumferential position [1] is a driven pulley belt leaving position from which the drive power transfer belt 516 leaves the driven pulley 518 that is rotationally driven by the drive power transfer belt 516. The circumferential position [2] is a drive pulley belt entering position at which the drive power transfer belt 516 comes to ride on the drive pulley 520 that transfers drive power to the drive power transfer belt 516. The circumferential position [3] is a drive pulley belt leaving position from which the drive power transfer belt 516 leaves the drive pulley 520. The circumferential position [4] is a driven pulley belt entering position at which the drive power transfer belt 516 comes to ride on the driven pulley 518.

Referring to FIG. 14B, in the section from the circumferential position [3] to the circumferential position [4], the stacked elements 510 are pressed against each other for the drive power transfer. On the other hand, in the section from the circumferential position [1] to the circumferential position [2], the elements 510 are pressed against each other more lightly than they are in the section from the circumferential position (3) to the circumferential position (4), and therefore the amount of yawing motion of each element 510 is large in the section from the circumferential position [1] to the circumferential position [2]. In the section from the circumferential position [2] to the circumferential position [3], the yaw angle of each element 510 is made closer to the zero level by the drive pulley 520. That is, the positions of the respective elements 510 are straightened in the belt-riding section at the drive pulley 520. According to the related-art elements 510, for example, yawing motions of the elements 510 are not sufficiently restricted by the engagement between the projection 514 and the recess 512, and therefore each element 510 largely yaws at the drive pulley belt entering position (i.e., the circumferential position [2]), resulting possibly in an increase in the belt loss described above. Although the example case illustrated in FIGS. 14A and 14B is mainly for explanation on yawing of the elements 510, an increase in the amount of pitching motion of each element 510 may possibly cause an increase in the belt loss, etc.

It is to be noted that such problems have never been addressed in public.

SUMMARY OF THE INVENTION

In view of the above, the invention has been made, and it provides elements of a drive power transfer belt of a belt-drive continuously variable transmission for vehicles, which are less likely to exhibit undesirable behaviors and motions.

An aspect of the invention relates to a set of elements that are arranged, in an element thickness direction, in series along a looped ring of a drive power transfer belt wound on a pair of pulleys of a belt-drive continuously variable transmission. Each of the elements has a recess that is provided at one side of the element and a projection projecting from the other side of the element to fit into the recess of the adjacent element. The projection has a first engagement portion that is provided at a base side of the projection such that a predetermined engagement gap is created on a radially outer side of the first engagement portion when the projection fits in the recess of the adjacent element, and a second engagement portion which is provided at a tip side of the projection and that, at least partially, decreases in diameter thereof toward a tip of the projection from the first engagement portion, wherein a gradient with which the diameter of the second engagement portion decreases toward the tip of the projection is larger than a gradient with which a diameter of the first engagement portion decreases toward the tip of the projection.

According to the set of elements structured as described above, owing to the second engagement portion provided at the tip side of the projection, the projection smoothly engages with the recess of the adjacent element as compared to a case where the projection is columnar having a substantially uniform diameter. Further, in a case where the projection of each element is columnar, the relative positions of the projection and the recess are radially restricted by the entirety of the projection. According to the elements of the foregoing aspect of the invention, on the other hand, the relative position of the projection is not restricted radially at the second engagement portion, that is, it is restricted only at the first engagement portion located lower than the top of the projection. Therefore, in a case where the width of the predetermined engagement gap is to be set to allow the elements adjacent to each other to incline, as viewed in the axial direction of the pulleys, relative to each other at a certain angle, rather than remaining parallel to each other, in the belt-riding sections, the width of the predetermined engagement gap can be set smaller than the radial gap that would be created between the projection and the recess if the projection was columnar having a substantially uniform diameter. As a result, each element is sufficiently restricted so as not to move upward, downward, leftward, and rightward excessively in directions parallel or substantially parallel to the opposed sides of the respective elements in the belt-released sections, and undesirable behaviors and motions of each element are more effectively suppressed by the engagement between the projection and the recess than they would be if the projection of each element was columnar. As a result, for example, the power loss (belt loss) is reduced.

Further, the set of elements of the foregoing aspect of the invention may be such that: each of the elements has a ring-fit groove in which the ring is fit; and a gap that is created in a radial direction of the pulley between a radially outer side inner face of the ring-fit groove and an outer peripheral face of the ring when a radially inner side inner face of the ring-fit groove is in contact with an inner peripheral face of the ring is larger than the predetermined engagement gap. Each element is moved toward the radially outer side of the drive power transfer belt by the recess of the preceding adjacent element and the ring at the moment the element leaves each pulley. According to the above-described structure, the work of the recess of the preceding adjacent element in the above state is large, and therefore the pressing force that the element applies, when moved toward the radially outer side of the drive power transfer belt, to the ring is small, resulting in a longer life of the ring, that is, a longer life of the drive power transfer belt.

Further, the set of elements of the foregoing aspect of the invention may be such that an inclined face of which a gradient with respect to an axis of the projection is larger than a gradient of the first engagement portion with respect to the axis of the projection is provided at least at a portion, at a side corresponding to a radially outer side of the drive power transfer belt, of the second engagement portion. According to this structure, the gap between the tip of the projection and the recess is sufficiently large at the side corresponding to the radially outer side of the drive power transfer belt. As such, when the adjacent elements incline relative to each other at a certain angle, as viewed in the axial direction of the pulleys, in the belt-riding sections at the respective pulleys, each projection is more unlikely to interfere with or contact the recess into which the same projection fits. It is to be understood that the inclined face of which the gradient with respect to the axis of the projection is larger than the gradient of the first engagement portion with respect to the same axis may be provided only at the portion, at the side corresponding to the radially outer side of the drive power transfer belt, of the second engagement portion.

Further, the set of elements of the foregoing aspect of the invention may be such that a height of the first engagement portion from the other side of the element is within a range of 0.25 to 0.4 mm. According to this structure, undesirable behaviors and motions of each element in the belt-released sections can be more effectively suppressed, and further the distance over which the outer peripheral face of the projection and the inner peripheral face of the recess rub against each other when the projection and the recess slide on each other in the longitudinal direction of the drive power transfer belt at the drive pulley belt leaving position, the drive pulley belt entering position, the driven pulley belt entering position, and the driven pulley belt leaving position is reduced, resulting in a smaller power loss that is caused by the outer peripheral face of the projection and the inner peripheral face of the recess rubbing against each other. It is to be noted that "the drive pulley belt leaving position" is the position from the drive power transfer belt leaves the drive pulley, "the drive pulley belt entering position" is the position at which the drive power transfer belt comes to ride on the drive pulley, "the driven pulley belt entering position" is the position at which the drive power transfer belt comes to ride on the driven pulley, and "the driven pulley belt leaving position" is the position from which the drive power transfer belt leaves the driven pulley. For example, if the height of the first engagement portion is smaller than 0.25 mm, there arises a possibility of insufficient engagement between the first engagement portion and the recess in a state where the projection of one element fits in the recess of the element adjacent to it, and this may result in a failure to suppress undesirable behaviors and motions of the elements sufficiently in the belt-released sections. On the other hand, if the height of the first engagement portion is larger than 0.4 mm, there arises a possibility of an excessive increase in the distance over which the outer peripheral face of the projection and the inner peripheral face of the recess rub against each other, and this may result in an increase in the power loss (belt loss).

Further, the set of elements of the foregoing aspect of the invention may be such that an outer peripheral face of the second engagement portion includes a portion formed by rounding a peripheral edge of a top face of the projection at a curvature radius of 0.4 to 0.5 mm. According to this structure, undesirable behaviors and motions of the elements at each belt-released section can be more properly suppressed. Further, the distance over which the outer peripheral face of the projection and the inner peripheral face of the recess rub against each other when the projection and the recess slide on each other in the longitudinal direction of the drive power transfer belt at the drive pulley belt leaving position, the drive pulley belt entering position, the driven pulley belt entering position, and the driven pulley belt leaving position is reduced, resulting in a smaller power loss that is caused by the outer peripheral face of the projection and the inner peripheral face of the recess rubbing against each other. For example, if the curvature radius is larger than 0.5 mm, there arises a possibility of insufficient engagement between the first engagement portion and the recess in a state where the projection of one element fits in the recess of the element adjacent to it, and this may result in a failure to suppress undesirable behaviors and motions of the elements sufficiently in the belt-released sections. On the other hand, if the curvature radius is smaller than 0.4 mm, there arises a possibility of an excessive increase in the distance over which the outer peripheral face of the projection and the inner peripheral face of the recess rub against each other, and this may result in an increase in the power loss.

Further, the set of elements of the foregoing aspect of the invention may be such that the diameter of the projection decreases toward the tip of the projection from the other side of the element, and the element having said projection is located on an inner side of an arc that is drawn about a rocking center about which said element rocks relative to the element adjacent to said element, as viewed in an axial direction of the pulleys, such that the arc runs through a position at a base of said projection, the position being most distant from the rocking center. According to this structure, for example, when the projection slides, in the longitudinal direction of the drive power transfer belt, into the recess mating with it as the element having the same projection rocks about the rocking center at the drive pulley belt leaving position, the drive pulley belt entering position, the driven pulley belt entering position, or the driven pulley belt leaving position, the rubbing between the outer peripheral face of the projection and the inner peripheral face of the recess can be reduced, resulting in a decrease in the power loss that is caused by such rubbing.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 6A is an enlarged view of the projection and its periphery shown in the front view of FIG. 4;

FIG. 6B is a sectional view of the projection, which is taken along the line indicated by the arrows B1 in FIG. 6A;

FIG. 6C is a sectional view of the projection, which is taken along the line indicated by the arrows C1 in FIG. 6A, which is orthogonal to the line indicated by the arrows B1 in FIG. 6A;

DETAILED DESCRIPTION OF EMBODIMENTS

Figure 1:
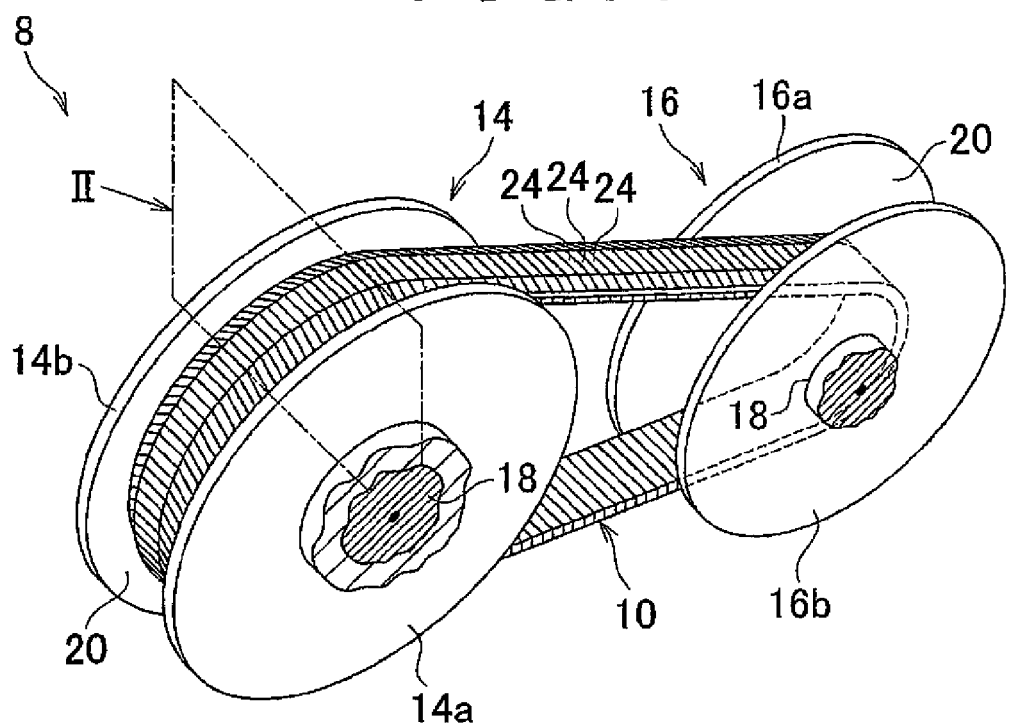
FIG. 1 is a perspective view illustrating a state where a drive power transfer belt to which the invention is applied is set in a belt-drive continuously variable transmission for vehicles.
Figure 2:
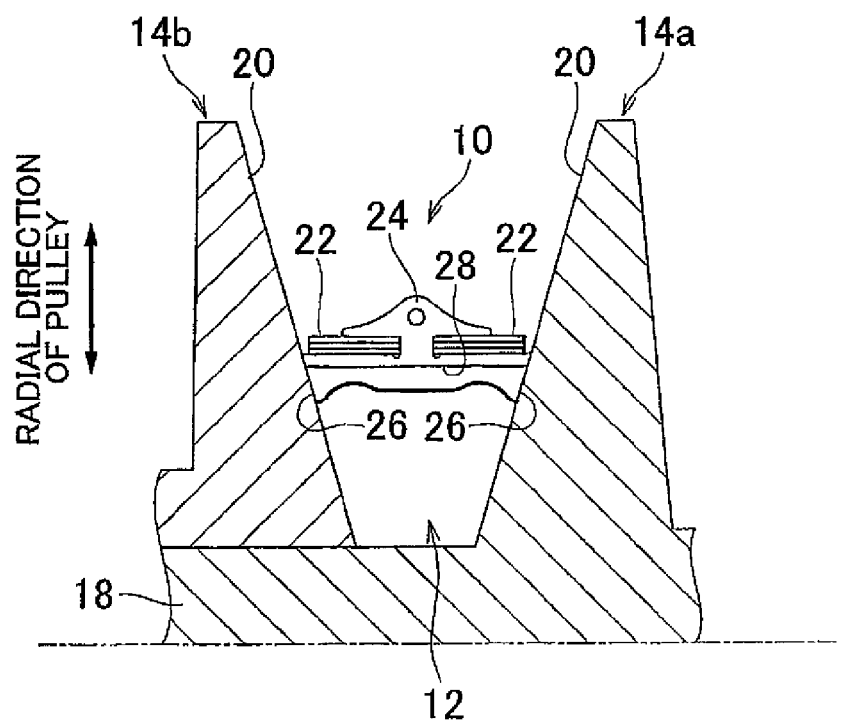
FIG. 2 is a sectional view taken along the plane indicated by the arrow II in FIG. 1, showing cross sections of the drive power transfer belt and its periphery.

Hereinafter, en example embodiment of the invention will be described in detail with reference to the drawings. FIG. 1 is a perspective view illustrating, by way of example, a state where a drive power transfer belt 10 to which the invention is applied is set in a vehicle belt-drive continuously variable transmission 8 (will hereinafter be referred to as "the belt-drive continuously variable transmission 8"). FIG. 2 is a sectional view taken along the plane indicated by the arrow II in FIG. 1, showing cross sections of the drive power transfer belt 10 and its periphery. Referring to FIGS. 1 and 2, the drive power transfer belt 10 is a compression type drive power transfer belt (metallic belt) that is wound on a first pulley 14 and a second pulley 16 that are rotatable, respectively, about two parallel axes and that each have a V-groove 12 which is provided at the radially outer side of the pulley and of which the width is variable. The first pulley (first sheave pair) 14 is an input pulley to which the drive power of an engine, which is the drive power source of the vehicle, is input, and the second pulley (second sheave pair) 16 is an output pulley from which the drive power is output to the drive wheels of the vehicle. The first pulley 14 is constituted of a stationary sheave 14a fixed on a rotational shaft 18 and a moveable sheave 14b provided on the rotational shaft 18 such that it is axially moveable relative to the rotational shaft 18. Likewise, the second pulley 16 is constituted of a stationary sheave 16a fixed on another rotational shaft 18 and a moveable sheave 16b provided on the rotational shaft 18 such that it is axially moveable relative to the rotational shaft 18. A sheave face 20 is provided at the moveable sheave 14b side face of the stationary sheave 14a, and another sheave face 20 is provided at the stationary sheave 14a side face of the moveable sheave 14b. Likewise, a sheave face 20 is provided at the moveable sheave 16b side face of the stationary sheave 16a, and another sheave face 20 is provided at the stationary sheave 16a side face of the moveable sheave 16b. The distance, as measured in the axial direction of the first pulley 14, between the sheave faces 20 of the first pulley 14 increases toward the radially outer side, defining a conical space between the sheaves 20. Likewise, the distance, as measured in the axial direction of the second pulley 16, between the sheave faces 20 of the second pulley 16 increases toward the radially outer side, defining a conical space between the sheaves 20. That is, each V-groove 12 is defined by the paired sheave faces 20. It is to be noted that the first pulley 14 and the second pulley 16 correspond to "a pair of pulleys" in the invention. Further; it is to be noted that the first pulley 14 and the second pulley 16 will be collectively, or simply, referred to as "pulley" or "pulleys" where they do not need to be distinguished from each other.

Figure 5:
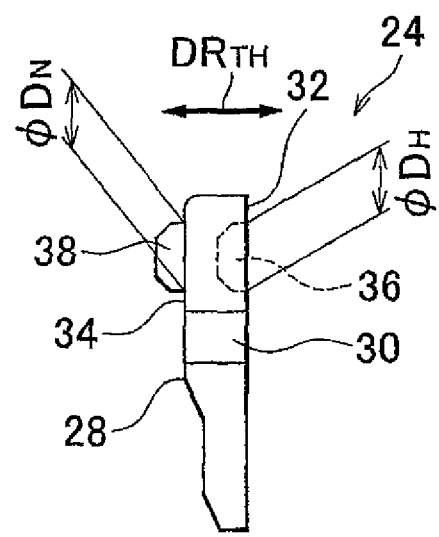
FIG. 5 is a right side view of the element shown in FIG. 4.

The drive power transfer belt 10 is provided with a pair of rings 22 each constituted of multiple looped flexible steel bands stacked on top of each other, and a plurality of elements 24 that are thin metal members supported by the rings 22 and stacked into a loop along the rings 22 in the direction indicated by the arrow $DR_{TH}$ in FIG. 5. Note that the direction $DR_{TH}$ is the direction in which the thickness of each element 24 is measured and thus it will hereinafter be referred to as "the element thickness direction $DR_{TH}$".

Each ring 22 is manufactured by, for example, forming a high-tension steel band, which is approximately 0.2 mm in thickness, into a loop, and then laminating nine or so of the thus formed steel bands.

Figure 3:
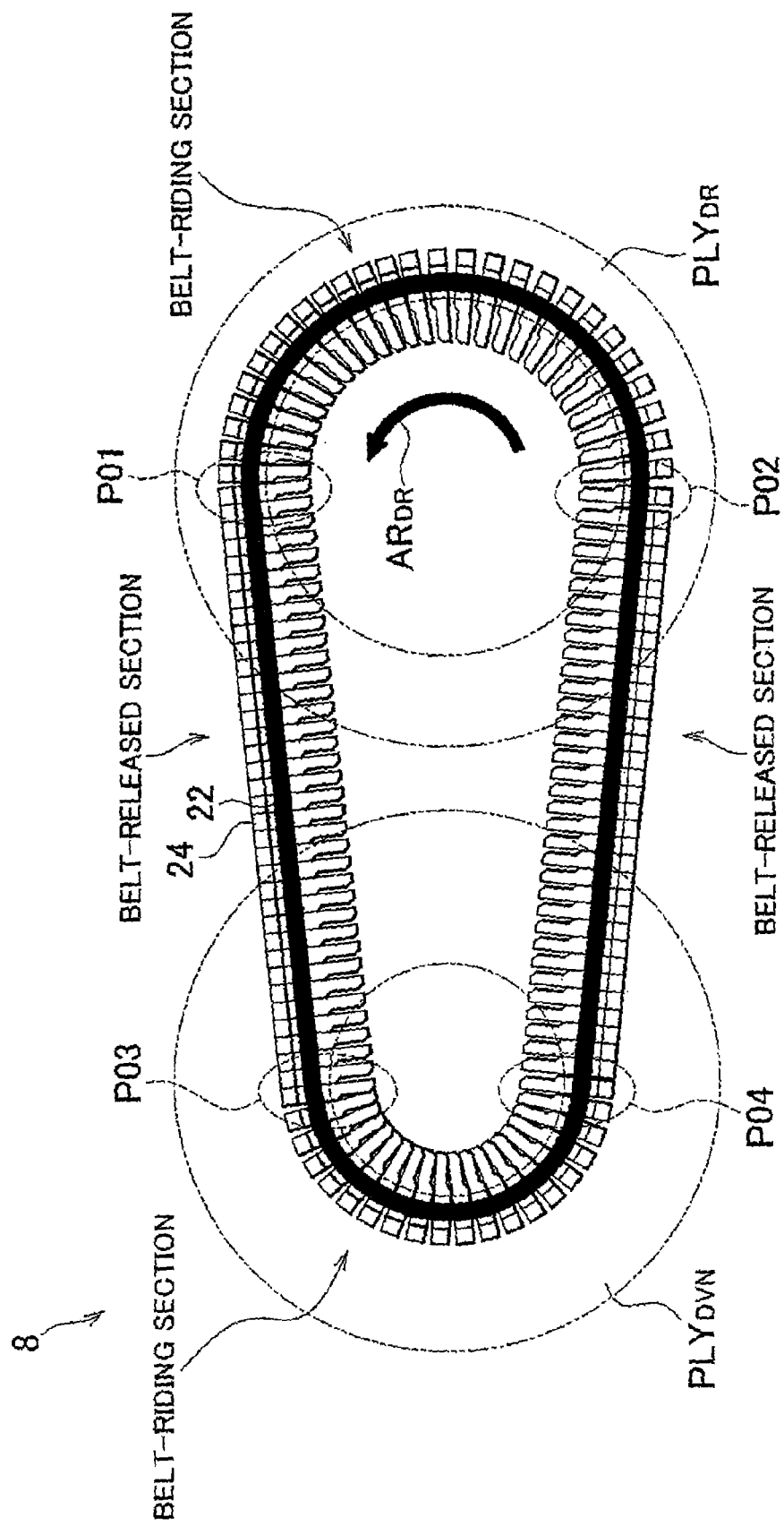
FIG. 3 is a view illustrating a state where the drive power transfer belt is wound on the paired pulleys of the continuously variable transmission shown in FIG. 1.

FIG. 3 is a view illustrating, by way of example, a state where the drive power transfer belt 10 is wound on the paired pulleys 14 and 16. In FIG. 3, a drive pulley (drive sheave pair) $PLY_{DR}$ is the pulley from which drive power is transferred to the drive power transfer belt 10, while a driven pulley (driven sheave pair) $PLY_{DVN}$ is the pulley to which drive power is transferred from the drive power transfer belt 10. That is, in a situation where drive power is being transferred to the drive wheels of the vehicle from the engine, the first pulley 14 serves as the drive pulley $PLY_{DR}$, while the second pulley 16 serves as the driven pulley $PLY_{DVN}$. On the other hand, in a situation where drive power is being transferred to the engine from the drive wheels of the vehicle, such as during engine brake, the second pulley 16 serves as the drive pulley $PLY_{DR}$, while the first pulley 14 serves as the driven pulley $PLY_{DVN}$. In the example case illustrated in FIG. 3, the first pulley 14 is the drive pulley $PLY_{DR}$, and the second pulley 16 is the driven pulley $PLY_{DVN}$. Referring to FIG. 3, the sections in which the elements 24 of the drive power transfer belt 10 ride on the respectively pulleys 14 and 16 will hereinafter be referred to as "belt-riding sections" where necessary, and the sections between the two belt-riding sections (i.e., the sections in which the elements 24 of the drive power transfer belt 10 are on neither of the pulleys 14 and 16) will hereinafter be referred to as "belt-released sections" where necessary.

When the drive pulley $PLY_{DR}$ rotates to propel the drive power transfer belt 10 as indicated by the arrow $AR_{DR}$ in FIG. 3, a position P01 at the drive pulley $PLY_{DR}$ is a drive pulley belt leaving position from the drive power transfer belt 10 leaves the drive pulley $PLY_{DR}$, a position P02 at the drive pulley $PLY_{DR}$ is a drive pulley belt entering position at which the drive power transfer belt 10 comes to ride on the drive pulley $PLY_{DR}$, a position P03 at the driven pulley $PLY_{DVN}$ is a driven pulley belt entering position at which the drive power transfer belt 10 comes to ride on the driven pulley $PLY_{DVN}$, and a position P04 at the driven pulley $PLY_{DVN}$ is a driven pulley belt leaving position from which the drive power transfer belt 10 leaves the driven pulley $PLY_{DVN}$. In the example case illustrated in FIG. 3, since the drive power transfer belt 10 is running in the direction indicated by the arrow $AR_{DR}$, the drive power is transferred to the driven pulley $PLY_{DVN}$ from the drive pulley $PLY_{DR}$ with the elements 24 pressed against each other in the belt-released section between the drive pulley belt leaving position P01 to the driven pulley belt entering position P03.

Figure 4:
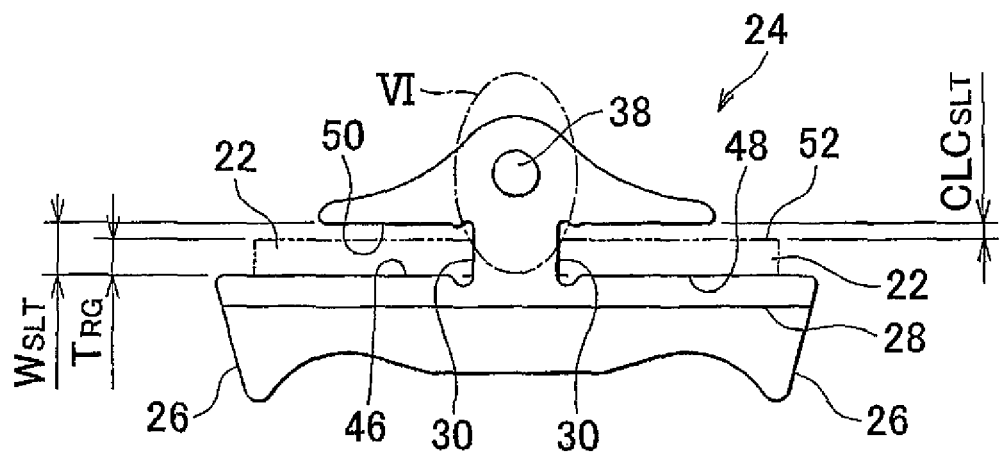
FIG. 4 is a front view of each element of the example embodiment of the invention, as seen in the element thickness direction.

FIG. 4 is a front view of each element 24, as viewed in the same direction as FIG. 2, that is, the element thickness direction $DR_{TH}$. FIG. 5 is a right side view of the element 24 shown in FIG. 4. Each element 24 is a thick platy part manufactured by, for example, punching, in a pressing process, a steel plate that is approximately 1.8 mm in thickness. That is, in the drive power transfer belt 10, a number of the elements 24 are arranged in series along the rings 22 in the element thickness direction $DR_{TH}$.

Referring to FIGS. 2, 4, and 5, each element 24 has a pair of contact faces 26, a rocking edge portion 28, a pair of ring-fit grooves 30, a first face 32, a second face 34, and a recess (hole) 36, and a projection 38. The two contract faces 26 are opposed to and in contact with the respective sheave faces 20. The rocking edge portion 28 extends straight, or substantially straight, in the axial direction of the pulleys 14 and 16. The two ring-fit grooves 3 are grooves in which the respective rings 22 are fit and which restrict the respective rings 22 radially with respect to the elements 24. The first face 32 is one of faces in the element thickness direction $DR_{TH}$, while the second face 34 is the other. The recess (hole) 36 is provided in the first face 32 at a position that is on the radially outer side of the rocking edge portion 28 with respect to the drive power transfer belt 10. The projection 38 projects from the second face 34 so as to fit into the recess 36 of the adjacent element 24.

The rocking edge portion 28 serves as the center about which the element 24 rocks relative to the adjacent element 24, as viewed in the axial direction of the pulleys 14 and 16, when the element 24 contacts the adjacent element 24 in each belt-riding section in which the drive power transfer belt 10 bends.

The second face 34 of each element 24 is parallel, or substantially parallel to the first face 32 of the same element 24. In a state where the elements 24 are stacked on each other in the element thickness direction $DR_{TH}$, the second face 34 of each element 24 is opposed to the first face 32 of the element 24 adjacent to it.

The recess 36 of each element 24 is a dent formed by, for example, pressing the first face 32. The axis of the recess 36 is perpendicular to the first face 32, and the inner peripheral face of the recess 36 is circular as viewed in the axial direction of the recess 36. The recess 36 is formed such that a radial gap having a predetermined width and an axial gap having a predetermined width are created between the recess 36 and the projection 38 of the adjacent element 24 when the same projection 38 fit in the recess 36.

FIGS. 6A, 613, and 6C are views showing the detailed form of the projection 38 of each element 24. More specifically, FIG. 6A is an enlarged view of the projection 38 and its periphery, as viewed in the same direction in FIG. 4 (refer to the area V1 in FIG. 4). FIG. 6B is a sectional view of the projection 38, which is taken along the line indicated by the arrows B1 in FIG. 6A. FIG. 6C is a sectional view of the projection 38, which is taken along the line indicated by the arrows C1 in FIG. 6A, which is orthogonal to the line indicated by the arrows B1. The projection 38 of each element 24 is formed, for example, as a result of forming the recess 36 by pressing. That is, as the recess 36 is formed by pressing, the projection 38 is upraised perpendicularly from the second face 34. In this example embodiment of the invention, the recess 36 and the projection 38 of each element 24 are coaxial. The height of the projection 38 from the second face 34, which will hereinafter be referred to as "projection height" where necessary) is, for example, 0.75 to 0.8 mm. Referring to FIG. 6B, the projection 38 has a first engagement portion 40 provided at the base side of the projection 38 and a second engagement portion 42 provided at the tip side of the projection 38. Referring to FIG. 6C, an outer peripheral face 40a of the first engagement portion 40 is circular as viewed in the axial direction of the projection 38, and an outer peripheral face 42a of the second engagement portion 42 is also circular as viewed in the axial direction of the projection 38. A top face 44 of the projection 38 is flat, or generally flat.

The first engagement portion 40, which a portion of the projection 38 as described above, serves to restrict, radially, the position of the projection 38 relative to the position of the recess 36 in which the projection 38 fits. The first engagement portion 40 may be formed in a columnar shape of which the diameter is uniform. In this example embodiment, however; the outer peripheral face 40a of the first engagement portion 40 is tapered at a tapering angle corresponding to the draft angle for the pressing described above, so that the diameter of the projection 38 decreases toward its tip. The first engagement portion 40 is formed such that a radial engagement gap CLC1 having a predetermined width is created between the first engagement portion 40 of the projection 38 and the recess 36 of the adjacent element 36 when the projection 38 fits in the recess 36. More specifically, the radial engagement gap CLC1 is created between the recess 36 and the first engagement portion 40 of the projection 38 when the projection 38 and the recess 36 of the adjacent element 24 are in engagement with each other, and at least the portion, which is opposed to the outer peripheral face 40a of the first engagement portion in this state, of the inner peripheral face of the recess 36 is tapered at the same tapering angle as the outer peripheral face 40a of the first engagement portion 40. The width of the radial engagement gap CLC1 is calculated as the difference between the diameter of the recess 36 and that of the first engagement portion 40. Referring to FIG. 5, if the diameter of the first engagement portion 40 measured when the projection 38 is in a predetermined position along the axial direction of the projection 38 and in engagement with the recess 36 is $D_N$ and the diameter of the recess 36 measured when the recess 36 is in a predetermined position along the axial direction of the recess 36 and in engagement of the projection 38 is $D_H$, the width of the radial engagement gap CLC1 is calculated as $D_H - D_N$. More specifically, the diameter $D_N$ of the first engagement portion 40 is the diameter of the first engagement portion 40 measured at its base, and the diameter $D_H$ of the recess 36 is the diameter of the recess 36 measured at its opening. The width of the radial engagement gap CLC1 is, for example, empirically set to a value that does not inhibit nor hinder the elements 24 in engagement from rocking properly about their rocking edge portions 28, respectively, in the element thickness direction $DR_{TH}$ when the same elements 24 are in either of the belt-riding sections shown in FIG. 3 and that sufficiently suppresses undesirable behaviors and motions, such as pitching and yawing, of the elements 24 when they are at the drive pulley belt leaving position P01 of the drive pulley $PLY_{BR}$ or at the drive pulley belt entering position P02 of the drive pulley $PLY_{DR}$ (refer to FIG. 3) and when they are at the driven pulley belt entering position P03 of the driven pulley $PLY_{DVN}$ or at the driven pulley belt leaving position P04 of the driven pulley $PLY_{DVN}$ (refer to FIG. 3). The height of the first engagement portion 40 from the second face 34 is not limited to any specifically value. However, preferably, it is set within the range of 0.25 to 0.4 mm. This range of the height of the first engagement portion 40 has been empirically set as a range that ensures that the first engagement portion 40 of the projection 38 and the recess 36 engage enough to suppress undesirable behaviors and motions of the elements 24 when they are stacked on each other in either of the belt-released sections described above, and that minimizes the power loss caused by the outer peripheral face 40a of the first engagement portion 40 and the inner peripheral face of the recess 36 rubbing against each other at the drive pulley belt leaving position P01, the drive pulley belt entering position P02, the driven pulley belt entering position P03, and the driven pulley belt leaving position P04 (refer to FIG. 3).

Next, the second engagement portion 42 extending from the first engagement portion 40 toward to the tip of the projection 38 is adapted to ensure that the projection 38 smoothly fits into the recess 36 of the adjacent element 24. More specifically, referring to FIGS. 6A, 6B, and 6C, the second engagement portion 42 is formed such that its diameter decreases toward to the tip of the projection 38 from the upper end of the first engagement portion 40. Further, the diameter decrease gradient with respect to the direction from the base to the tip of the projection 38 is larger at the second engagement portion 42 than at the first engagement portion 40. That is, the tapering angle of the outer peripheral face 42a of the second engagement portion 42 is larger than that of the outer peripheral face 40a of the first engagement portion 40. The width of the radial gap that is created between the recess 36 and the second engagement portion 42 when the recess 36 and the second engagement portion 42 are in engagement with each other is equal to or larger than the width of the radial engagement gap. CLC1 (preferably larger than the width of the radial engagement gap CLC1). That is, the width of the radial engagement gap CLC1 is the minimum width of the radial gap between the recess 36 and the projection 38 when the recess 36 and the projection 38 are in engagement with each other. In other words, the radial engagement gap CLC1 is the minimum radial gap between the recess 36 and the projection 38.

Referring to FIG. 4, as viewed in the element thickness direction $DR_{TH}$, the ring-fit grooves 30 of each element 24 are rectangular, extending outward in the axial direction of the pulleys 14 and 16. In the drive power transfer belt 10, a radially inner side inner face 46 of the ring-fit groove 30 and an inner peripheral face 48 of the ring 22 are opposed to each other, while a radially outer side inner face 50 of the ring-fit groove 30 and an outer peripheral face 52 of the ring 22 are opposed to each other. Further, a slot width $W_{SLT}$, which is the interval between the radially inner side inner face 46 and the radially outer side inner face 50 of the ring-fit groove 30, is larger than a radial thickness $T_{RG}$ of the ring 22. Further, the width of a slot gap $CLC_{SLT}$ ($=W_{SLT}-T_{RG}$), which is the gap that is created, on the radially outer side of the ring 22, between the radially outer side inner face 50 of the ring-fit groove 30 and the outer peripheral face 52 of the ring 22 when the radially inner side inner face 46 of the ring-fit groove 30 and the inner peripheral face 48 of the ring 22 are in contact with each other, is empirically set as follows. For example, the width of the slot gap $CLC_{SLT}$ is empirically set to a value that does not inhibit nor hinder the element 24 from rocking about the rocking edge portion 28 while the drive power transfer belt 10 is running and that ensures smooth engagement between the recess 36 and the projection 38 at the elements 24 stacked on each other. The slot gap $CLC_{SLT}$ is larger than the radial engagement gap CLC1.

According to the example embodiment, the projection 38 of each element 24 has the first engagement portion 40 that is provided at the base side of the projection 38 such that, when the projection 38 fits in the recess 36 of the adjacent element 24, the radial engagement gap CLC1 is created between the first engagement portion 40 and the recess 36. Further, the projection 38 of each element 24 has the second engagement portion 42 that is provided at the tip side of the projection 38 and decreases in diameter toward the tip of the projection 38 from the upper end of the first engagement portion 40 with a gradient, with respect to the direction from the base to the tip of the projection 38, being larger than the gradient with which the first engagement portion 40 decreases in the same direction. As such, owing to the second engagement portion 42 provided at the tip side of the projection 38, the projection 38 more smoothly engages with the recess 36 of the adjacent element 24 than it would do if the projection 38 was columnar having a substantially uniform diameter. Further, if the projection 38 was columnar, the relative positions of the projection 38 and the recess 36 would be radially restricted by the entirety of the projection 38. According to the example embodiment, on the other hand, the relative position of the projection 38 is not restricted radially at the second engagement portion 42, that is, it is restricted only at the first engagement portion 40 located lower than the top of the projection 38. Therefore, in a case where the width of the radial engagement gap CLC1 is to be set to allow the elements 24 adjacent to each other to incline, as viewed in the axial direction of the pulleys 14 and 16, relative to each other at a certain angle, rather than remaining parallel to each other, in either of the belt-riding section at the pulley 14 and that at the second pulley 16, the width of the radial engagement gap CLC1 can be set smaller than it would be if the projection 38 was columnar having a substantially uniform diameter. As a result, each element 24 is sufficiently restricted so as not to move, relative to other elements 24, upward, downward, leftward, and rightward excessively in directions parallel, or substantially parallel to the first face 32, when the element 24 is in either of the belt-released sections, and undesirable behaviors and motions of each element 24 are more effectively suppressed by the engagement between the projection 38 and the recess 36 than they would be if the projection 38 of each element 24 was columnar having a substantially uniform diameter. As a result, for example, the power loss (belt loss) that may be caused by undesirable behaviors and motions of the elements 24 in the respective belt-released sections is reduced. Further, a decrease in the contact area between the sheave faces 20 which may be caused by undesirable behaviors and motions of each element 24 can be minimized, and wear of the sheave faces 20 which may occur as the positions of the respective elements 24 are straightened in the belt-riding sections in the respective pulleys 14 and 16 (refer to FIG. 3) can minimized. Further, owing to the second engagement portion 42 provided at the tip side of the projection 38 of each element 24, the distance (slide distance) over which the inner peripheral face of the recess 36 and the outer peripheral face of the projection 38 rub against each other as the element 24 rocks about the rocking edge portion 28 is shorter than it would be if the entire outer peripheral face of the projection 38 was tapered at an angle that is equal to or substantially equal to the tapering angle of the first engagement portion 40 described above, and therefore the power loss due to the rubbing (slippage) between the inner peripheral face of the recess 36 and the outer peripheral face of the projection 38 is small. In the following, the effects of the reduced undesirable behaviors and motions of the elements 24 and the reduced power losses will be described in more detail with reference to FIGS. 7A, 7B and FIGS. 8A and 8B, respectively.

Figure 7A:
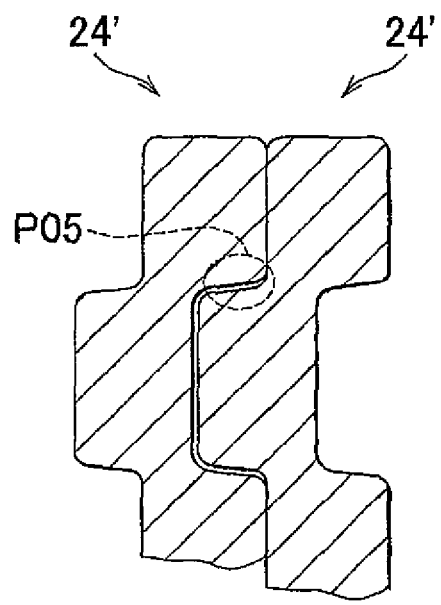
FIG. 7A is a view showing elements, each having a projection with an outer peripheral face uniformly tapered, of a comparative example for a comparison with the elements of the example embodiment of the invention.
Figure 7B:
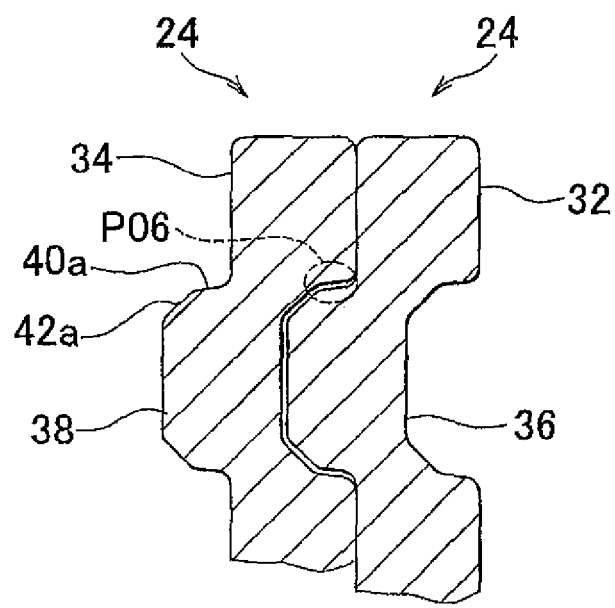
FIG. 7B is a view illustrating, by way of example, how the projection of one element fits in the recess of other element when the multiple elements are stacked on each other in either of the belt-released sections shown in FIG. 3 and how undesirable behaviors and motions of the elements are suppressed.

FIG. 7A is a view illustrating, by way of example, how the projection 38 of one element 24' of a comparative example fits in the recess 36 of other element 24' when the elements 24' are stacked on each other in either of the belt-released section between the drive pulley belt leaving position P01 and the driven pulley belt entering position P03 and the belt-released section between the driven pulley belt leaving position P04 and the drive pulley belt entering position P02. Note that the projection 38 of each element 24' of the comparative example shown in FIG. 7A does not have any portion corresponding to the second engagement portion 42, that is, the outer peripheral face of the projection 38 is uniformly tapered. In contrast, FIG. 7B is a view illustrating, by way of example, how the projection 38 of one element 24 of the example embodiment fits in the recess 36 of other element 24 when the elements 24 of the example embodiment are stacked on each other in either of the belt-released section between the drive pulley belt leaving position P01 and the driven pulley belt entering position P03 and the belt-released section between the driven pulley belt leaving position P04 and the drive pulley belt entering position P02. FIG. 7A is a sectional view longitudinally taken along the axes of the projections 38 of the respective elements 24' of the comparative example. FIG. 7B is a sectional view longitudinally taken along the axes of the projections 38 of the respective elements 24 of the example embodiment. It is to be noted that the sectional views 7A and 73 shows the same side of the element as the side of the element shown by FIG. 5. In the following, how undesirable behaviors and motions of each element 24 of the example embodiment are suppressed will be described, by way of example, with reference to FIGS. 7A and 7B. Referring to FIG. 7B, in the example embodiment, the width of the radial gap between the inner peripheral face of the recess 36 and the outer peripheral face 40a of the first engagement portion 40 of the projection 38 (refer to the area P06 shown in FIG. 7B) is minimum (i.e., the radial engagement gap CLC1) when the elements 24 are in either of the belt-released sections described above, and the width of the same minimum gap is equal to or substantially equal to the width of the radial gap that is created between the inner peripheral face of the recess 36 and the outer peripheral face of the projection 38 (refer to the area P05 shown in FIG. 7A) when the elements 24' of the comparative example are in either of the belt-released sections described above. As such, providing the projection 38 of each element 24 with the second engagement portion 42 is effective to sufficiently inhibit the element 24 from moving, relative to other elements 24, upward, downward, leftward, and rightward excessively in directions parallel or substantially parallel to the first face 32 without diminishing the effect of reducing undesirable behaviors and motions of each element 24 in the belt-released sections. That is, the projections 38 of the respective elements 24 of the example embodiment provide the effect that undesirable behaviors and motions of each element 24 are suppressed in the belt-released sections, as does the projections 38 of the elements 24' of the comparative example shown in FIG. 7A do. That is, in the example embodiment, since undesirable behaviors and motions of each element 24 are suppressed in the belt-released sections due to the engagement gap CLC1 created as described above, each element 24 is in a good position when reaching the drive pulley belt entering position P02 and when reaching the driven pulley belt entering position P03.

Figure 8A:
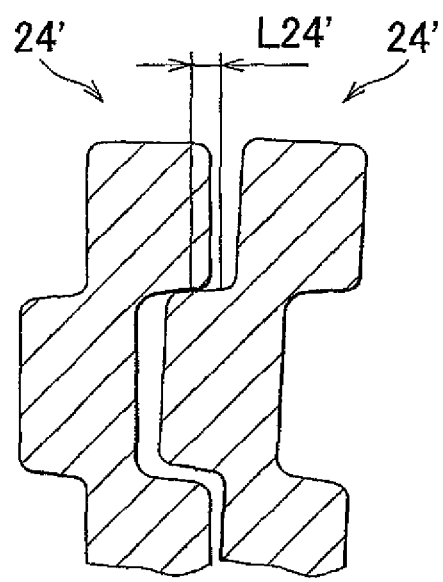
FIG. 8A is a view illustrating, by way of example, how a power loss occurs with related-art elements, for a comparison with the example embodiment in which such a power loss is reduced effectively.
Figure 8B:
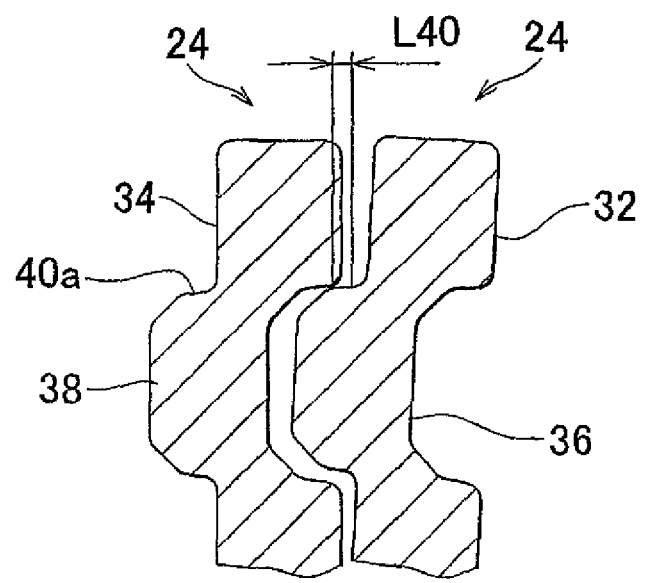
FIG. 8B is a view illustrating, by way of example, how the inner peripheral face of the recess of one of the elements of the example embodiment and the outer peripheral face of the projection of the element adjacent to it rub against each other, and illustrating, by way of example, how a power loss caused by the drive power transfer belt is reduced.

FIG. 8A is a view illustrating, by way of example, how the inner peripheral face of the recess 36 of one of the elements 24' of the comparative example and the outer peripheral face of the projection 38 of the element 24' adjacent to it rub against each other. FIG. 8B is a view illustrating, by way of example, how the inner peripheral face of the recess 36 of one of the elements 24 of the example embodiment and the outer peripheral face of the projection 38 of the element 24 adjacent to it rub against each other. In the following, how the power loss can be reduced in the example embodiment of the invention will be described, by way of example, with reference to FIGS. 8A and 8B. It is to be noted that FIGS. 8A and 8B are longitudinal sectional views, like FIGS. 7A and 7B, and the elements 24' shown in FIG. 8A correspond to the elements 24' of the comparative example shown in FIG. 7A, while the elements 24 shown in FIG. 8B correspond to the elements 24 of the example embodiment shown in FIG. 7B. At the drive pulley belt leaving position P01, the drive pulley belt entering position P02, the driven pulley belt entering position P03, and the driven pulley belt leaving position P04 (refer to FIG. 3) at which each element 24 (24') shifts from the belt-riding section to the belt-released section or vice versa, the motion of each element 24 (24') shifts from a curvilinear motion (i.e., the motion in each belt-riding section) to a linear motion (i.e., the motion in each belt-released section) or vice versa, and therefore the curvature radius of the drive power transfer belt 10 (i.e., each portion of the drive power transfer belt 10 entering or leaving the pulley) changes, causing the stacked elements 24 (24') to rock about their rocking edge portions 28, respectively, as shown in FIGS. 8A and 8B. In this state, the inner peripheral face of the recess 36 and the outer peripheral face of the projection 38 slide, in the longitudinal direction of the drive power transfer belt 10, on each other at the side corresponding to the radially outer side of the drive power transfer belt 10, and at this time, the stacked elements 24 (24') are pressed against each other, producing compressing force compressing each element 24 (24') in the element thickness direction $DR_{TH}$. In this way, a power loss (belt loss) is caused by the sliding of the recess 36 and the projection 38. If such a power loss is denoted "$LSS_{BLT}$", it is calculated by the following equation (1). Note that the unit of the power loss $LSS_{BLT}$ is W, for example.

$$LSS_{BLT} = \mu \times Q \times \sin\beta \times LH \times ((Din \times \pi/t) \times (Nin/60)) \times 2 \quad (1)$$

In the equation (1) above, $\mu$ is the friction coefficient between the inner peripheral face of the recess 36 and the outer peripheral face of the projection 38. Q represents the compression force acting, on the element 24 (24') in the element thickness direction $DR_{TH}$ as described above. $\beta$ represents the inclination angle (hole angle) of the inner peripheral face of the recess (hole) 36 relative to its axis. LH represents the distance over which the recess 36 and the projection 38 slide on each other. In the comparative example illustrated in FIG. 8A, the slide distance LH is a length L24' of the liner portion of the outer peripheral face of the projection of the element 24' as viewed in the longitudinal sectional view. In the example embodiment illustrated in FIG. 8B, on the other hand, the slide distance LH is a length L40 of the linear portion of the outer peripheral face 40a of the first engagement portion 40 as viewed in the longitudinal sectional view. Further, Din represents the pitch diameter (effective diameter) of the belt at the drive pulley $PLY_{DR}$, t represents the thickness of each element 24 (24'), and Nin represents the rotation speed of the drive pulley $PLY_{DR}$. Note that unit of the rotation speed Nin is rpm, for example. Thus, "((Din×π/t)× (Nin/60))×2" represents the number of times the recess 36 and the projection 38 slide on each other per second, that is, the number times the recess 36 and the projection 38 contact each other per second.

As is known from the equation (1) above, the shorter the slide distance LH, the smaller the power loss $LSS_{BLT}$. In view of this, since the linear portion length L40 shown in FIG. 8B, which corresponds to the slide distance LH as described above, is shorter than the linear portion length L24' shown in FIG. 8A, it is considered that the power losses caused by the recess 36 and the projection 38 sliding (slipping) on each other at the drive pulley belt leaving position P01, the drive pulley belt entering position P02, the driven pulley belt entering position P03, and the driven pulley belt leaving position P04 (refer to FIG. 3) are smaller in the example embodiment shown in FIG. 8B than in the comparative example shown in FIG. 8A.

According to the example embodiment, each element 24 has the ring-fit groove 30 in which the ring 22 is fit, and the width of the slot gap $CLC_{SLT}$ between the radially outer side inner face 50 of the ring-fit groove 30 and the outer peripheral face 52 of the ring 22, as measured in the radial directions of the pulleys 14 and 16 in a state where the radially inner side inner face 46 of the ring-fit groove 30 and the inner peripheral face 48 of the ring 22 are in contact with each other, is larger than the width of the radial engagement gap CLC1 (=$D_H$–$D_N$). Each element 24 is moved toward the radially outer side of the drive power transfer belt 10 by the recess 36 of the preceding adjacent element 24 and the rings 22 at the moment the element 24 leaves each pulley 14 and 16, that is, at the moment the element 24 passes though the drive pulley belt leaving position P01 and the driven pulley belt leaving position P04 (refer to FIG. 3). According to the above-described structure of the example embodiment, the work of the recess 36 of the preceding adjacent element 24 in the above state is large, and therefore the pressing force that the element 24 applies, when moved toward the radially outer side of the drive power transfer belt 10, to the rings 22 is small, resulting in longer lives of the rings 22, that is, a longer life of the drive power transfer belt 10. In the following, how each element 24 is moved toward the radially outer side of the drive power transfer belt 10 at the drive pulley belt leaving position P01 and at the driven pulley belt leaving position P04 will be described in more detail with reference to FIG. 9.

Figure 9:
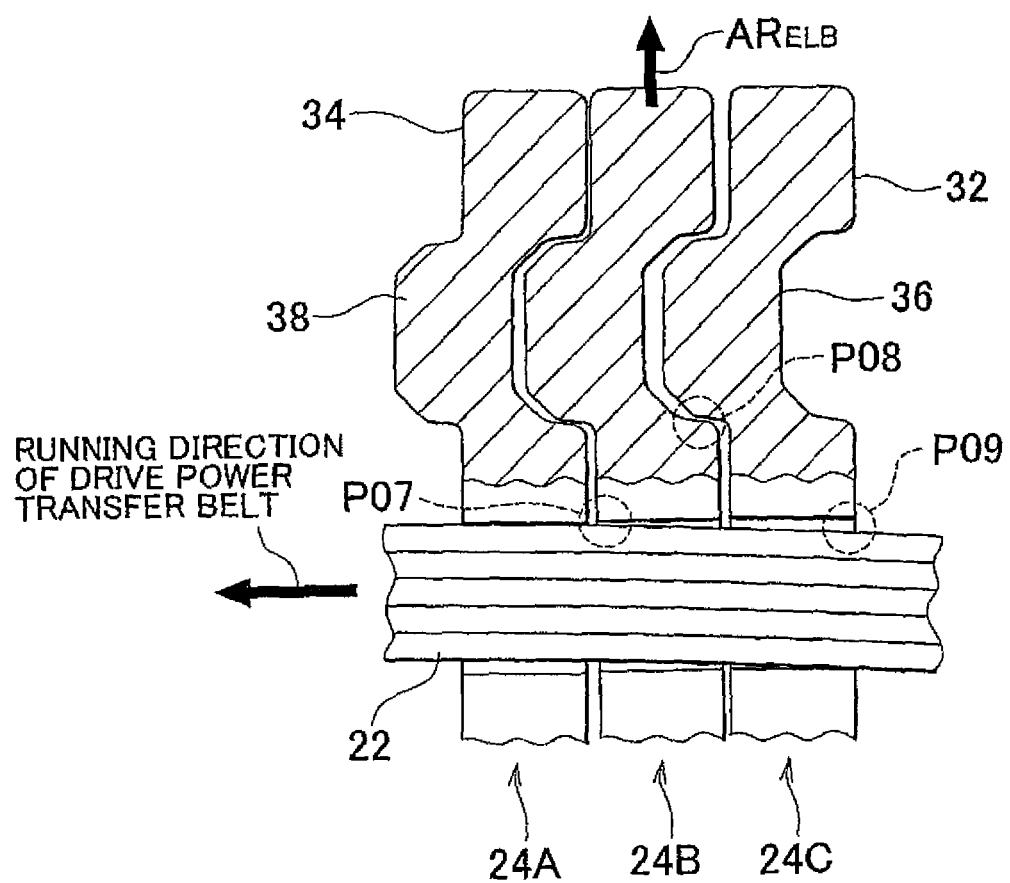
FIG. 9 is an enlarged view of the recess, the ring, and their peripheries at the drive pulley belt leaving position P01 or at the driven pulley belt leaving position P04 shown in FIG. 3, illustrating, by way of example, how each element is moved toward the radially outer side of the drive power transfer belt at the drive pulley belt leaving position P01 and at the driven pulley belt leaving position P04.

FIG. 9 is an enlarged view of the recess 36, the ring 22, and their peripheries at the drive pulley belt leaving position P01 or at the driven pulley belt leaving position P04, and it illustrates, by way of example, how each element 24 is moved toward the radially outer side of the drive power transfer belt 10 at the drive pulley belt leaving position P01 and at the driven pulley belt leaving position P04. Although it appears in FIG. 9 that the ring 22 has a five-layer structure, this is only for simplifying the illustration, and it does not show the number of the actual layers of each ring 22. FIG. 9 is a longitudinal sectional view showing the recess 36 and the projection 38, as are FIGS. 7A and 7B. The side where the projections 38 of the respective elements 24 are present corresponds to the side where the belt-released section is present, while the side where the recesses 36 of the respective elements 24 are present corresponds to the side where the belt-riding section is present. For facilitating understanding on the descriptions, in FIG. 9, the elements 24 are denoted "the element 24A", "the element 24B", and "the element 24C" in this order from the belt-released section side. In the state illustrated in FIG. 9, the radially outer side inner face 50 of the ring-fit groove 30 of the element 24B starts to contact, from the second face 34 side, the outer peripheral face 52 of each ring 22 (refer to the area P07) and therefore the element 24B is lifted up by the rings 22 toward the radially outer side of the drive power transfer belt 10, as indicated by the arrow $AR_{ELB}$, as the drive power transfer belt 10 runs. Then, as a result of the element 24B lifted up to the radially outer side of the drive power transfer belt 10, the projection 38 of the element 24C and the recess 36 of the element 24B contact each other in the area P08 that is the engagement section between the recess 36 and the projection 38 at the side corresponding to the radially inner side of the drive power transfer belt 10, so that the recess 36 of the element 24B lifts the element 24C up toward the radially outer side of the drive power transfer belt 10 as the drive power transfer belt further runs. Then, when the radially outer side inner face 50 of each ring-fit groove 30 of the element 24C starts to contact the outer peripheral face 52 of the corresponding ring 22, the element 24C is lifted up by the rings 22 toward the radially outer side of the drive power transfer belt 10, as has been the element 24B. As mentioned earlier, in the elements 24 of the example embodiment, the slot gap $CLC_{SLT}$ (refer to the area P09 shown in FIG. 9) is larger than the radial engagement gap CLC1. However, if the slot gap $CLC_{SLT}$ of the elements 24 was smaller than the radial engagement gap CLC1, the radially outer side inner face 50 of each ring-fit groove 30 would contact the outer peripheral face 52 of the corresponding ring 22 at the element 24C before the recess 36 of the element 24B contacts the projection 38 of the element 24C in the area P08, causing an increase in the compressive stress, that is, the pressing force occurring in the thickness direction of the rings 22 (i.e., the direction in which the thickness of each ring 22 is measured) when the element 24C is lifted up toward the radially outer side of the drive power transfer belt 10. With the elements 24 of the example embodiment, as such, it is possible to reduce the pressing force that each element 24 applies to the rings 22 when it is moved toward the radially outer side of the drive power transfer belt 10 at the drive pulley belt leaving position P01 and at the driven pulley belt leaving position P04, resulting in a longer life of the drive power transfer belt 10.

According to the example embodiment, further, the height of the first engagement portion 40 from the second face 34 of the projection 38 is preferably within the range of 0.25 to 0.4 mm. In this case, undesirable behaviors and motions of each element 24 in the belt-released sections can be more effectively suppressed, and further, as described above with reference to FIGS. 8A and 8B, the distance over which the outer peripheral face of the projection 38 and the inner peripheral face of the recess 36 rub against each other when the projection 38 and the recess 36 slide on each other in the longitudinal direction of the drive power transfer belt 10 at the drive pulley belt leaving position P01, the drive pulley belt entering position P02, the driven pulley belt entering position P03, and the driven pulley belt leaving position P04 (refer to FIG. 3) is reduced, resulting in a smaller power loss that is caused by the outer peripheral face of the projection 38 and the inner peripheral face of the recess 36 rubbing against each other.

While the invention has been explained in conjunction with the specific exemplary embodiment thereof, it is evident that many alternatives, modifications, and variations will be apparent to those skilled in the art. Accordingly, the example embodiment of the invention as set forth herein is intended to be illustrative, not limiting.

For example, while the drive power transfer belt 10 has the two parallel rings 22 in the foregoing example embodiment as shown in FIG. 2, the number of the rings is not limited to two. That is, the drive power transfer belt may have a single ring or three or more rings.

Further, while it has been mentioned, by way of example, that the elements 24 in the foregoing example embodiment may be manufactured by pressing, the elements may be manufactured by various other methods, such as die-casting.

Figure 10A:
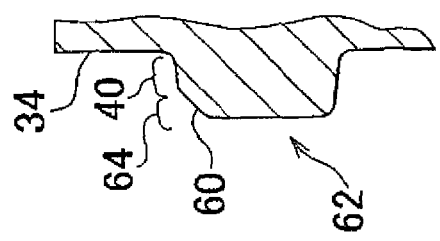
FIG. 10A is an enlarged view of a projection of an element as the first modification example of the example embodiment of the invention shown in FIGS. 6A, 6B, and 6C, and its periphery, showing the detailed form of the same projection.
Figure 10B:
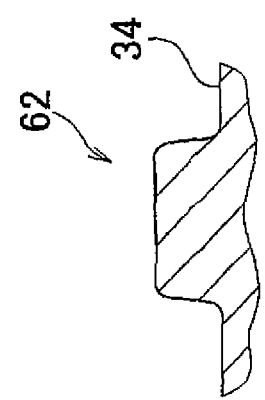
FIG. 10B is a sectional view of the projection taken along the line indicated by the arrows B2 in FIG. 10A.
Figure 10C:
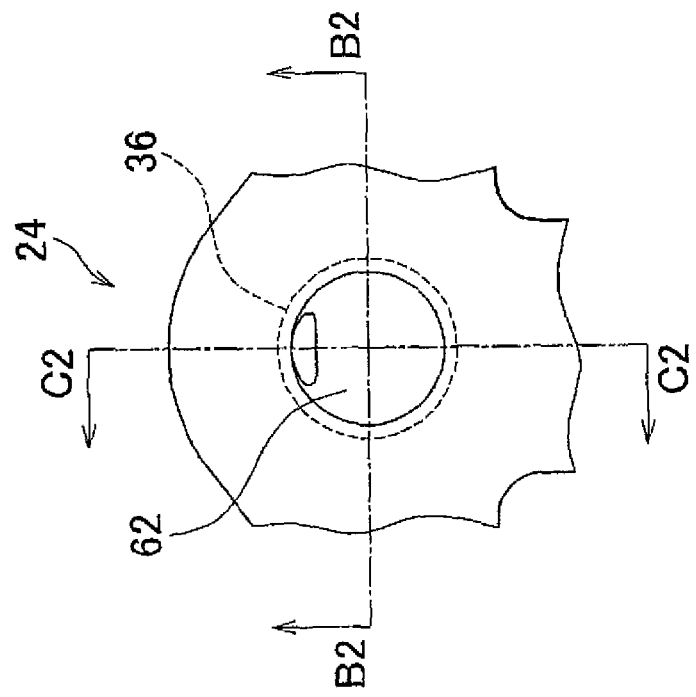
FIG. 10C is a sectional view of the projection taken along the line indicated by the arrows C2 in FIG. 10A, which is orthogonal to the line indicated by the arrows B2.

While the outer peripheral face 42a of the second engagement portion 42 of the projection 38 of each element 24 in the forgoing example embodiment is tapered over its entire circumference as shown in FIGS. 6A, 6B, and 6C, the entire circumferential face of the outer peripheral face 42a is not necessarily inclined by being tapered, for example. That is, for example, it is sufficient that an inclined face 60 that is larger in the gradient with respect to the axis of the projection 38 than that of the first engagement portion 40 be provided at least at a portion, at the side corresponding to the radially outer side of the drive power transfer belt 10, of the second engagement portion 42 (refer to FIGS. 10A, 10B, 10C, 11A, 11B, and 11C) as follows. For example, each element 24 may have, in place of the projection 38, a projection 62 shown in FIGS. 10A, 10B, and 10C as the first modification example of the foregoing example embodiment, or a projection 72 shown in FIGS. 11A, 11B, and 11C as the second modification example of the foregoing example embodiment. FIGS. 10A, 10B, and 10C are views for illustrating the detailed form of the projection 62 in the first modification example of the example embodiment, which replaces the projection 38 of the element 24. More specifically, FIG. 10A is an enlarged view of the projection 62 and its periphery, FIG. 10B is a sectional view of the projection 62 taken along the line indicated by the arrows B2 in FIGS. 10A, and FIG. 10C is a sectional view of the projection 62 taken along the line indicated by the arrows C2 in FIG. 10A, which is orthogonal to the line indicated by the arrows B2. Although the projection 62 shown in FIGS. 10A, 10B, and 10C is basically the same as the projection 38 described above, the projection 62 is different from the projection 38 in that the outer peripheral face of a second engagement portion 64 provided at the tip side of the projection 62 is basically tapered at an angle equal to the tapering angle of the outer peripheral face 40a of the first engagement portion 40 described above, and a portion, at the side corresponding to the radially outer side of the drive power transfer belt 10, of the second engagement portion 64 of the projection 62 is chamfered so as to form an inclined face (radially outer side inclined face) 60 that is larger in the gradient with respect to the axis of the projection 62 than that of the first engagement portion 40. For example, the gradient of the radially outer side inclined face 60 with respect to the axis of the projection 62 is, for example, equal to the gradient of the outer peripheral face 42a of the second engagement portion 42 shown in FIG. 6C.

Figure 11A:
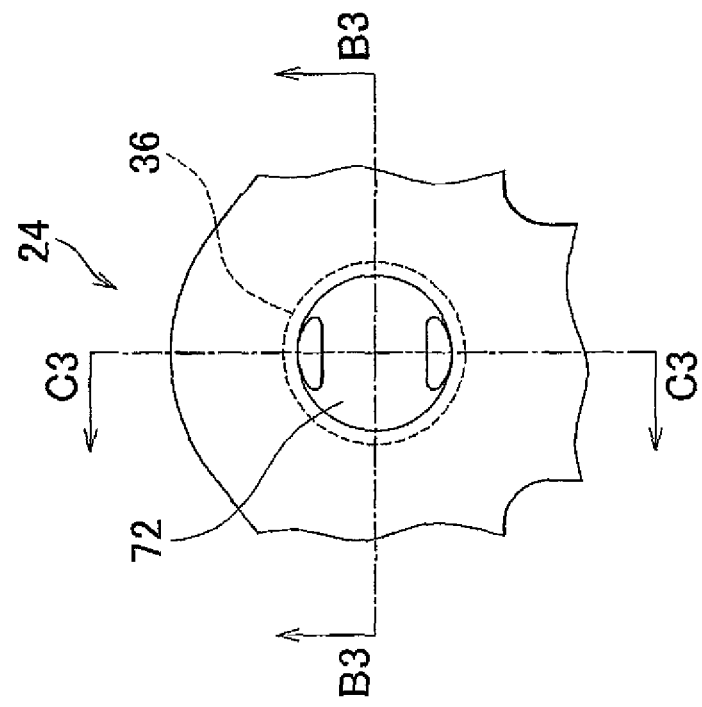
FIG. 11A is an enlarged view of a projection of an element as the second modification example of the example embodiment of the invention shown in FIGS. 6A, 6B, and 6C, and its periphery, showing the detailed form of the same projection.
Figure 11B:
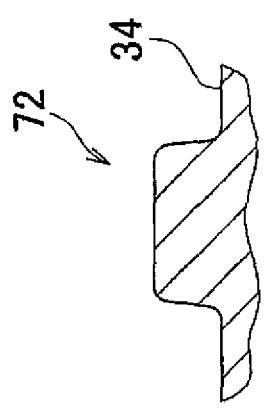
FIG. 11B is a sectional view of the projection taken along the line indicated by the arrows B3 in FIG. 11A.
Figure 11C:
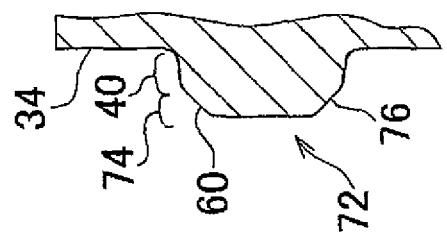
FIG. 11C is a sectional view of the projection taken along the line indicated by the arrows C3 in FIG. 11A, which is orthogonal to the line indicated by the arrows B3.

Next, FIGS. 11A, 11B, and 11C are views for illustrating the detailed form of the projection 72 in the second modification example of the example embodiment, which replaces the projections 38 and 62 described above. More specifically, FIG. 11A is an enlarged view of the projection 72 and its periphery, FIG. 11B is a sectional view of the projection 72 taken along the line indicated by the arrows B3 in FIG. 11A, and FIG. 11C is a sectional view of the projection 72 taken along the line indicated by the arrows C3 in FIG. 11A, which is orthogonal to the line indicated by the arrows B3. Although the projection 72 shown in FIGS. 11A, 11B, and 11C is basically the same as the projection 38 described above, the projection 72 is different from the projection 38 in that the outer peripheral face of a second engagement portion 74 provided at the tip side of the projection 72 is basically tapered at an angle equal to the tapering angle of the outer peripheral face 40a of the first engagement portion 40 described above, as in the case of the projection 62 shown in FIGS. 10A, 10B, and 10C, and a portion, at the side corresponding to the radially outer side of the drive power transfer belt 10, of the second engagement portion 74 and a portion, at the side corresponding to the radially inner side of the drive power transfer belt 10, of the second engagement portion 74 are both chamfered so as to form, at the side corresponding to the radially outer side of the drive power transfer belt 10, a radially outer side inclined face 60 that is the same as the radially outer side inclined face 60 of the projection 62 shown in FIGS. 10A, 10B, and 10C and to form, at the side corresponding to the radially inner side of the drive power transfer belt 10, a radially inner side inclined face 76 of which form is symmetrical, about the axis of the projection 72, to the form of the radially outer side inclined face 60.

As shown in FIGS. 6A, 6B, 6C, 10A, 10B, 10C, 11A, 11B, and 11C, the second engagement portion 42 of the projection 38, the second engagement portion 64 of the projection 62, and the second engagement portion 74 of the projection 72 have, respectively, the inclined faces 42a and 60 that are each provided at least at the side corresponding to the radially outer side of the drive power transfer belt 10 and are larger in the gradient with respect to the axes of the respective projections 38, 62, and 72 than the first engagement portion 40. Therefore, the gap between the tip side of the projection 38 and the recess 36, the gap between the tip side of the projection 62 and the recess 36, and the gap between the tip side of the projection 72 and the recess 36 are sufficiently large at the side corresponding to the radially outer side of the drive power transfer belt 10. As such, when the adjacent elements 24 incline relative to each other at a certain angle, as viewed in the axial direction of the pulleys 14 and 16, in the belt-riding sections at the respective pulleys 14 and 16, each projection 38, 62, and 72 is more unlikely to interfere with or contact the recess 36 into which the same projection fits. Further, the distance (slide distance) over which the recess 36 and the projection 38 shown in FIGS. 6A, 6B, and 6C rub against each other at the drive pulley belt leaving position P01, the drive pulley belt entering position P02, the driven pulley belt entering position P03, and the driven pulley belt leaving position P04 (refer to FIG. 3), which has been described earlier with reference to FIGS. 8A and 8B, does not change even if the projection 62 shown in FIGS. 10A, 10B, and 10C or the projection 72 shown in FIGS. 11A, 11B, and 11C is provided in place of the projection 38. That is, even in a case where the projection 38 shown in FIGS. 6A, 6B, and 6C is replaced with the projection 62 or the projection 72, the same power loss reduction effect as the projection 38 shown in FIGS. 6A, 6B, and 6C can be obtained.

Figure 12A:
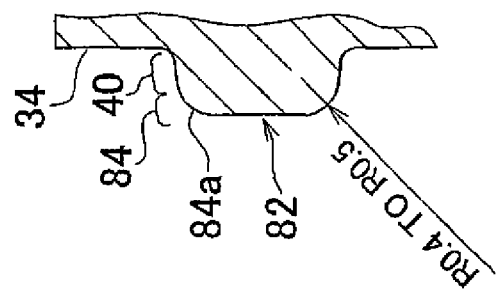
FIG. 12A is an enlarged view of a projection of an element as the third modification example of the example embodiment of the invention shown in FIGS. 6A, 6B, and 6C, and its periphery, showing the detailed form of the same projection.
Figure 12B:
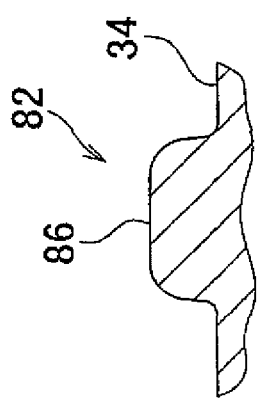
FIG. 12B is a sectional view of the projection taken along the line indicated by the arrows B4 in FIG. 12A.
Figure 12C:
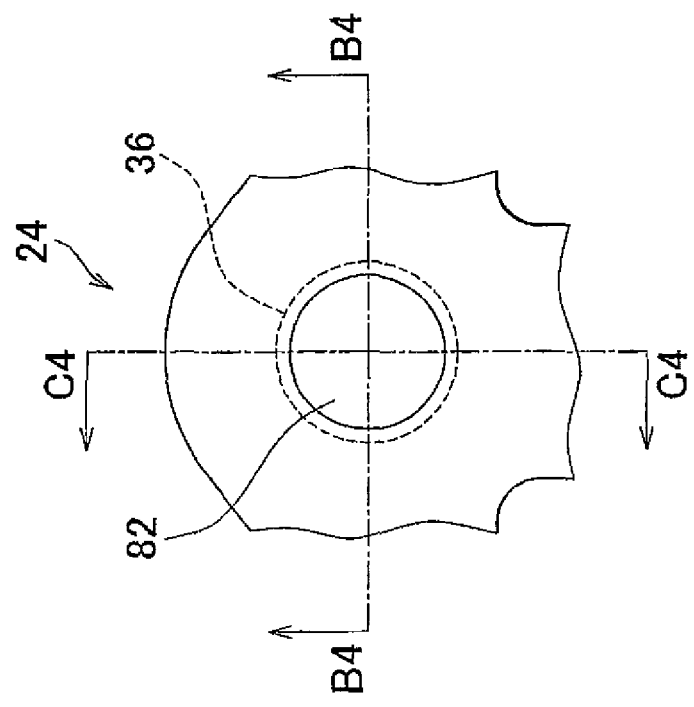
FIG. 12C is a sectional view of the projection taken along the line indicated by the arrows C4 in FIG. 12A, which is orthogonal to the line indicated by the arrows B4.
Figure 13:
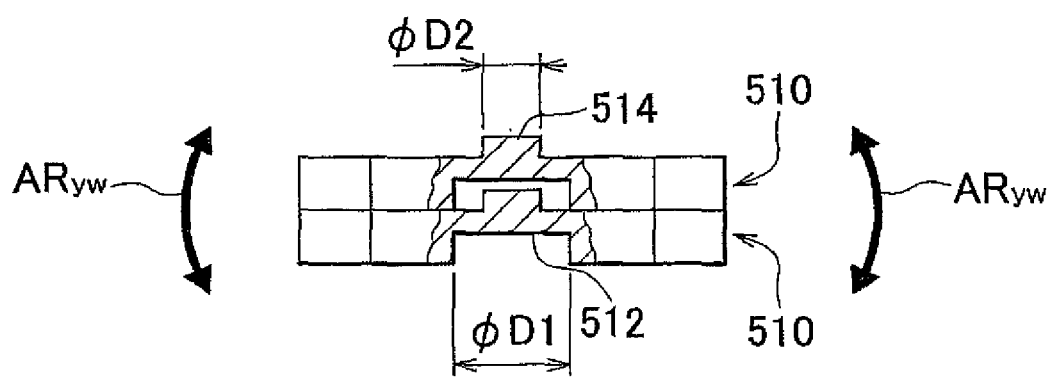
FIG. 13 is a view schematically illustrating an example case where elements are stacked on each other along the drive power transfer belt, as seen from the radially outer side of the drive power transfer belt, which is used for explaining, by way of example, a problem that the invention solves.
Figure 14A:
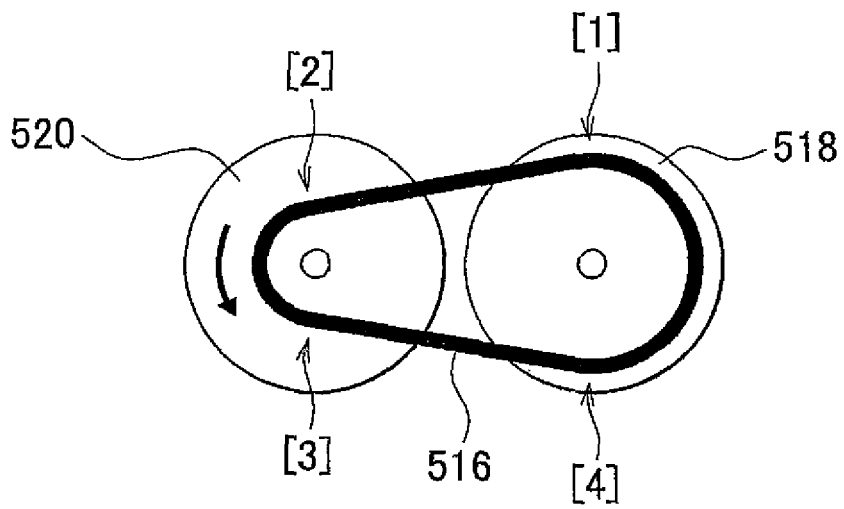
FIG. 14A is a simplified view illustrating the positional relation between a drive pulley, a driven pulley, and a drive power transfer belt of a related-art continuously variable transmission.
Figure 14B:
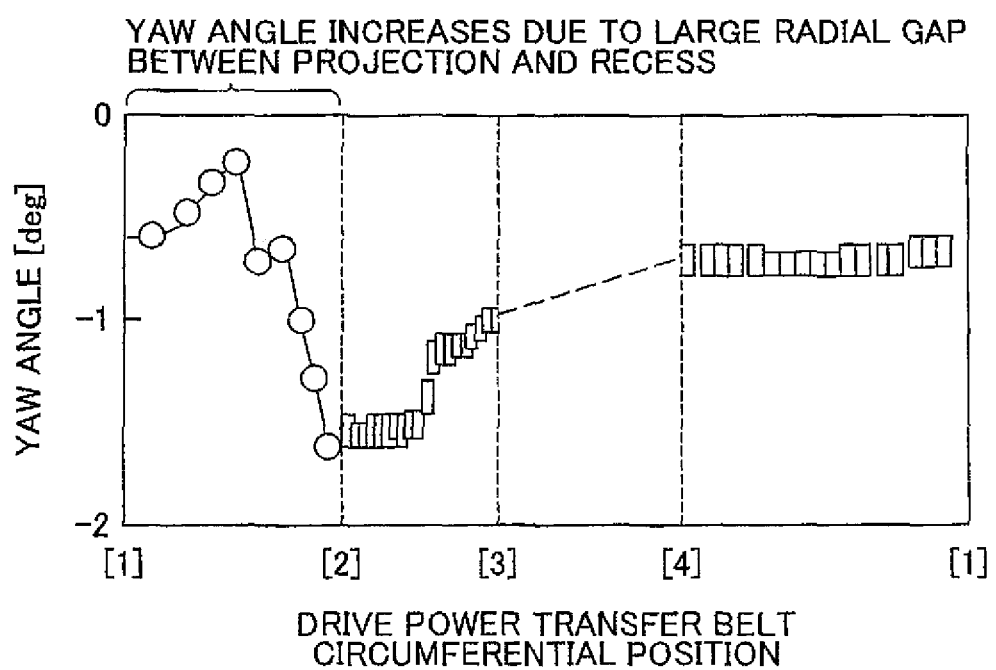
FIG. 14B is a view illustrating how the yaw angle of a related-art element changes over the entire circumference of a drive power transfer belt, which is used for explaining, by way of example, a problem that the invention solves.

According to the structure of the example embodiment shown in FIGS. 6A, 6B, and 6C, the outer peripheral face 42a of the second engagement portion 42 of the projection 38 is tapered. However, as the third modification example of the foregoing example embodiment, a projection 82 shown in FIGS. 12A, 12B, and 12C may be provided in place of the projection 38 shown in FIGS. 6A, 6B, and 6C. The projection 82 has a second engagement portion 84, and the second engagement portion 84 has an outer peripheral face 84a that is formed by rounding the peripheral edge of a top face 86 of the projection 82 at a curvature radius of 0.4 to 0.5 mm. FIGS. 12A, 12B, and 12C are views for illustrating the detailed form of the projection 82 of the third modification example of the example embodiment, which replaces the projections 38, 62 and 72 described above. More specifically, FIG. 12A is an enlarged view of the projection 82 and its periphery, FIG. 12B is a sectional view of the projection 82 taken along the line indicated by the arrows B4 in FIG. 12A, and FIG. 12C is a sectional view of the projection 82 taken along the line indicated by the arrows C4 in FIG. 12A, which is orthogonal to the line indicated by the arrows B4. Although the projection 82 shown in FIGS. 12A, 12B, and 12C is basically the same as the projection 38 described above, the projection 82 is different from the projection 38 in that the outer peripheral face 84a of the second engagement portion 84 provided at the tip side of the projection 82 is formed by rounding the peripheral edge of a top face 86 of the projection 82 at a curvature radius of 0.4 to 0.5 mm, rather than being tapered. The numerical range of 0.4 to 0.5 mm for the curvature radius has been empirically set as a numerical range that ensures that the first engagement portion 40 of the projection 38 and the recess 36 engage enough to suppress undesirable behaviors and motions of the elements 24 when they are stacked on each other in either of the belt-released sections described above, and that minimizes the power loss caused by the outer peripheral face 40a of the first engagement portion 40 and the inner peripheral face of the recess 36 rubbing against each other at the drive pulley belt leaving position P01, the drive pulley belt entering position P02, the driven pulley belt entering position P03, and the driven pulley belt leaving position P04 (refer to FIG. 3). Referring to FIGS. 12A, 12B, and 12C, since the outer peripheral face 84a of the second engagement portion 84 of the projection 82 is formed by rounding the peripheral edge of the top face 86 of the projection 82 at a curvature radius of 0.4 to 0.5 mm, undesirable behaviors and motions of the elements 24 can be more properly suppressed at each belt-released section. Further, as in the case described above with reference to FIGS. 8A and 8B, the distance over which the outer peripheral face of the projection 82 and the inner peripheral face of the recess 36 rub against each other when the projection 82 and the recess 36 slide on each other in the longitudinal direction of the drive power transfer belt 10 at the drive pulley belt leaving position P01, the drive pulley belt entering position. P02, the driven pulley belt entering position P03, and the driven pulley belt leaving position P04 (refer to FIG. 3) is reduced, resulting in a smaller power loss that is caused by the outer peripheral face of the projection 82 and the inner peripheral face of the recess 36 rubbing against each other. It is to be noted that the second engagement portion 84 of the projection 82 shown in FIGS. 12A, 12B, and 12C may additionally have the radially outer side inclined face 60 shown in FIGS. 10A, 10B, and 10C or the radially outer side inclined face 60 and the radially inner side inclined face 76 shown in FIGS. 11A, 11B, and 11C.

Meanwhile, as described above, the diameter of the projection 38 of the foregoing example embodiment decreases toward to the tip of the projection 38 from the second face 34 as shown in FIGS. 6A, 6B, and 6C. With regard to this structural feature, preferably, the projection 38 is located on the inner side (the side indicated by the arrow $AR_{IN}$ in FIG. 6C) of an arc ARC1 that is drawn about the rocking center about which the element 24 having the same projection 38 rocks relative to the elements 24 adjacent to it, as viewed in the axial direction of the pulleys 14 and 16, that is, the rocking edge portion 28 shown in FIG. 6C, such that the arc ARC1 runs through a position PT01 at the base of the projection 38, which is most distant from the rocking center (i.e., the rocking edge portion 28). According to this structure, for example, when the projection 38 slides, in the longitudinal direction of the drive power transfer belt 10, into the recess 36 mating with it as the element 24 having the same projection 38 rocks about the rocking edge portion 28 thereof (i.e., the rocking center) at the drive pulley belt leaving position P01, the drive pulley belt entering position P02, the driven pulley belt entering position P03, and the driven pulley belt leaving position P04 (refer to FIG. 3), the intensity of rubbing between the outer peripheral face of the projection 38 and the inner peripheral face of the recess 36 is small, resulting in a decrease in the power loss that is caused by such rubbing.

In the meantime, it is to be understood that although not described herein, there are various other modifications and changes that may be made without departing from the spirit and scope of the invention.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A set of elements that are arranged, in an element thickness direction, in series along a looped ring of a drive power transfer belt wound on a pair of pulleys of a belt-drive continuously variable transmission, each of the elements comprising:
  a recess that is provided at one side of the element;
  a projection projecting from the other side of the element to fit into the recess of the adjacent element, the projection having a first engagement portion that is provided at a base side of the projection such that a predetermined engagement gap is created on a radially outer side of the first engagement portion when the projection fits in the recess of the adjacent element, wherein a diameter of the first engagement portion at least partially decreases toward a tip of the projection from the base side of the projection, and a second engagement portion which is provided at a tip side of the projection and that, at least partially, decreases in diameter thereof toward the tip of the projection from the first engagement portion, wherein a gradient with which the diameter of the second engagement portion decreases toward the tip of the projection is larger than a gradient with which the diameter of the first engagement portion decreases toward the tip of the projection, and an inclined face is partially provided at an outer peripheral face of the second engagement portion.

2. The set of elements according to claim 1, wherein:
  each of the elements has a ring-fit groove in which a ring of the drive power transfer belt is fit; and
  a gap that is created in a radial direction of the pulley between a radially outer side inner face of the ring-fit groove and an outer peripheral face of the ring when a radially inner side inner face of the ring-fit groove is in contact with an inner peripheral face of the ring is larger than the predetermined engagement gap.

3. The set of elements according to claim 1, wherein an inclined face of which a gradient with respect to an axis of the projection is larger than a gradient of the first engagement portion with respect to the axis of the projection is provided at least at a portion, at a side corresponding to a radially outer side of the drive power transfer belt, of the second engagement portion.

4. The set of elements according to claim 1, wherein a height of the first engagement portion from the other side of the element is within a range of 0.25 to 0.4 mm.

5. The set of elements according to claim 1, wherein the diameter of the projection decreases toward the tip of the projection from the other side of the element, and the element having said projection is located on an inner side of an arc that is drawn about a rocking center about which said element rocks relative to the element adjacent to said element, as viewed in an axial direction of the pulleys, such that the arc runs through a position at a base of said projection, the position being most distant from the rocking center.

6. The set of elements according to claim 1, wherein
the diameter of the first engagement portion decreases toward the tip of the projection from the base side of the projection.

7. The set of elements according to claim 1, wherein
at least the portion of the inner peripheral face of the recess is tapered at a same tapering angle as the outer peripheral face of the first engagement portion, and
the portion of the inner peripheral face of the recess is opposed to the outer peripheral face of the first engagement portion, when the projection and the recess are in engagement with each other.

\* \* \* \* \*